Oct. 25, 1927.  
W. W. WARNER  
1,646,566  
AUTOMATIC HUMIDIFIER ATTACHMENT FOR WATER PANS  
Filed April 8, 1926
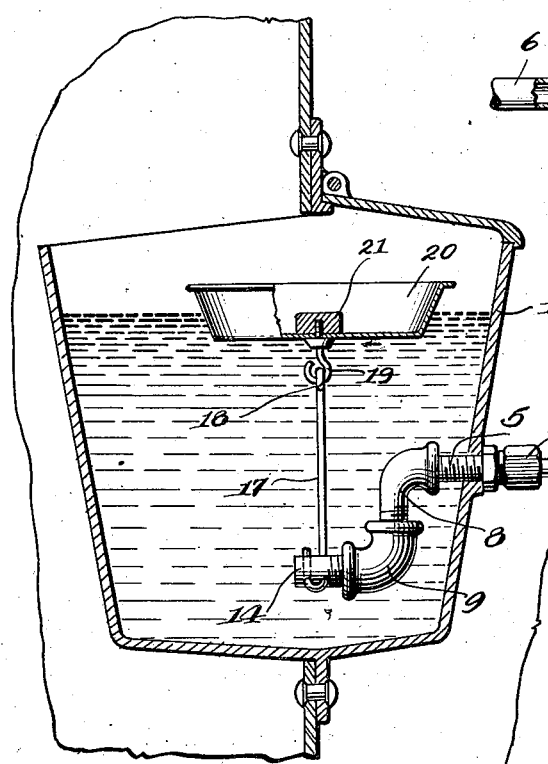
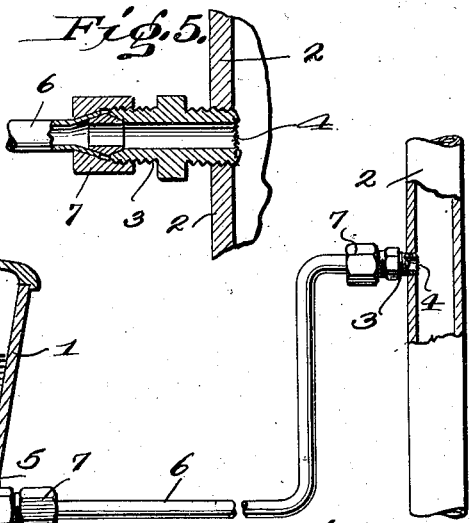
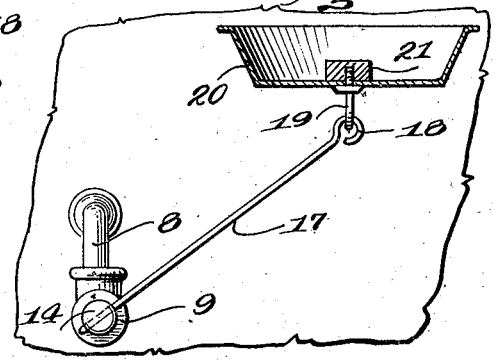
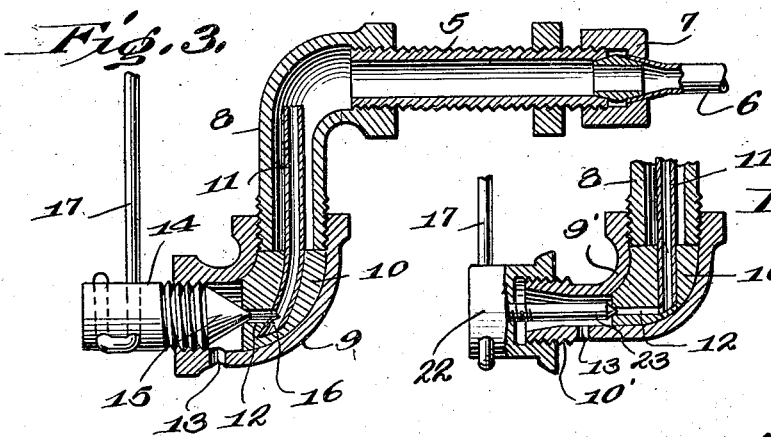
Inventor  
Walter W. Warner  
By  
Attorney Patented Oct. 25, 1927.

1,646,566

UNITED STATES PATENT OFFICE.

WALTER W. WARNER, OF DETROIT, MICHIGAN.

AUTOMATIC HUMIDIFIER ATTACHMENT FOR WATER PANS.

Application filed April 8, 1926. Serial No. 100,602.

This invention relates to an automatic humidifier attachment for steam or hot water radiators, hot air furnaces, and the like, and it consists in the novel features hereinafter described and claimed.

An object of the invention is to provide an attachment adapted to be applied to or connected with a pan or tank on a radiator or hot air furnace and connected with a water supply pipe, float operated valve means being provided for controlling the flow of water from the pipe to the pan so that the pan may at all times be supplied with a suitable quantity of the water and to avoid the necessity of supplying the water to the pan by hand.

With this object in view, the structure includes nipples one of which is attached to the water supply pipe and the other with the pan through the side thereof at a point below the normal water level of the pan. A pipe connects the said nipples together. A fitting is located interiorly of the pan and is connected with the inner end of the nipple that passes through the side of the pan. The said fitting contains a body of Babbitt metal which supports a tube adapted to separate rust and sediment from the water and a valve member is threaded in the fitting and is adapted to engage over the end of a duct provided in the body of Babbitt metal to control the flow of the water through the tube and the fitting. A float device is located interiorly of the pan and connected with the said valve member so that the water in the pan may be maintained at a predetermined level. Should the level of the water in the pan descend the valve member is turned whereby it is moved away from the duct in the body of the Babbitt metal and water is permitted to flow through the fitting into the pan and when the level of the water assumes its normal height the valve member is automatically moved toward and closes against the duct in the body of Babbitt metal, thus automatically cutting off the flow of the water.

In the accompanying drawings,

Figure 1 is a transverse sectional view of a water pan of a hot air furnace showing the humidifier applied thereto and connected with a water supply pipe, Figure 2 is a detailed end elevation of the fitting with connected parts and showing the float in section, Figure 3 is an enlarged longitudinal sectional view of the fitting and adjacent parts, Figure 4 is a fragmentary sectional view of a modified form of the fitting and valve, and Figure 5 is an enlarged sectional view of the nipple connected with the water supply pipe.

As a matter of illustration, a water pan or tank of a hot air furnace is shown at 1. This pan or tank is of the usual form. A water supply pipe is indicated at 2. A nipple 3 is threaded through the side of the pipe 2 and is provided at its inner end with a screen gauze 4 preferably of wire netting. A nipple 5 is threaded through the side of the pan 1 at a point below the normal water level of the said pan. A pipe 6 is connected at its ends with the nipples 3 and 5 by means of union nuts 7.

A fitting is located interiorly of the pan 1 and consists of an elbow member 8 which is connected with the inner end of the nipple 5 and an elbow member 9 which is connected with the lower end of the elbow member 8 as most clearly shown in Figure 3 of the drawings. A body of Babbitt metal 10 is located in the elbow 9 and supports a tube 11 which extends up into the elbow member 8 and which is spaced from the surface of the inner wall thereof. The body 10 is provided with a duct 12 opening through one end thereof and which communicates at its inner end with the interior of the tube 11 and the elbow 9 is provided at its lower side and at a point beyond the edge of the body 10 with a water outlet opening 13.

In the form of the arrangement as shown in Figures 1, 2, and 3 of the drawings, a valve member 14 is threaded in the elbow member 9 and is provided with a cone-shaped end portion adapted to close against the end edge of the duct 12. The cone-shaped portion 15 carries at its apex a pin 16 which is substantially triangular in cross section and which extends through the duct 12 and which enters the lower portion of the tube 11. The pin 16 is spaced from the walls of the duct and serves as means for keeping the passageway through the duct and the lower portion of the tube open. A rod 17 is fixed to the valve member 14 and is provided at its upper end with an eye 18 which is linked through an eye 19 carried at the center of the bottom of a float pan 20. The float pan 20 carries a weight 21 sufficient to submerge the float approximately one-half its height.

Assuming that the parts are in the positions as shown in Figure 1 of the drawings and should the level of the water in the pan 1 descend, the float pan 20 will also descend, thus swinging the rod 17 whereby the valve member 14 is turned in the elbow member 9 and the cone-shaped end portion 15 of the valve member is moved away from the end of the duct 12, thus opening the passageway through the duct 12 and permitting the water to flow through the tube 11, the duct 12, and through the outlet opening 13 into the pan. Thus, the supply of water in the pan 1 is replenished and the float pan 20 is elevated whereby the movement of the parts just described is reversed and the cone-shaped portion 15 is moved to a closed position over the end of the duct 12, thus cutting off the flow of the water into the pan 1. By reason of the fact that the upper portion of the tube 11 is spaced from the surface of the interior wall of the elbow member 8, any sediment or rust which may enter the elbow member 8 will gravitate upon the upper surface of the body 10 and thus the said sediment or rust will not flow through the tube to the valve seat engaged by the cone-shaped portion 15. At the same time the water may flow through the tube when the valve member 14 is open with relation to the duct.

In the form of the arrangement as shown in Figure 4 of the drawings, the elbow member 9' is exteriorly threaded as at 10'. A cap 22 is interiorly threaded and is arranged to screw upon the threads 10'. The rod 17 is connected with the cap 22. The cap 22 carries a centrally disposed valve pin 23 which is adapted to close against the end edge of the duct 12 in the body of Babbitt metal 10. This arrangement provides a simplified structure and the parts are strong and durable and consequently the device may be used advantageously in conjunction with a water supply system where the water is subjected to high pressure.

From the foregoing description, taken in conjunction with the accompanying drawings, it will be seen that I have provided an automatic humidifier attachment for steam, hot water, hot air furnaces, and the like, which may be easily and quickly applied and connected with a water supply pipe and which is efficient in its action and will maintain the level of the water in a tank or pan at a predetermined height without requiring the attention of an attendant.

My valve seat has a small or short bearing surface and most important of all is that it is composed of Babbitt metal to eliminate the wearing of an annular groove in the cone-shaped portion 15, which invariably causes a leak on account of bearing surface becoming too flat at this particular point. A long bearing seat is impractical because the mineral residue from hot water, even after straining, will form more on one side or part of the seat than on another, thus causing a leak. Also, an object point besides, there being provided a short bearing Babbitt seat, is that my needle pin 16 has a turning action which together with the water pressure keeps the seat clean, and a very small pressure of the cone-shaped portion 15 against the soft Babbitt seat is needed to completely stop the flow of water. My device is also constructed to operate below the surface of the water where it is least affected by heat.

It is a well known fact that Babbitt metal shrinks more when cooling than does brass or copper, and when the connection is made between the elbow 9 and elbow 8, the elbow 8 presses the babbitt tight against the interior surface of the elbow 9 in order to prevent the seeping of water between the Babbitt material 10 and elbow 9. Also by providing Babbitt material, it is easy to adjust the direction of pointing the elbow 8 when installing, as the Babbitt metal will allow an extra half turn or so. The tube 11 extending down in the Babbitt material is sealed tight at its end and does not touch the interior surface of the elbow 9, thus closing the end of the tube 11 and eliminating the danger of a leakage in case of shrinkage of the Babbitt metal.

The pan-like shape of my float 20 is important because a float of greater depth will invariably interfere with the castings above water pans in most furnaces. The pan is also weighted so that its buoyancy when half submerged is equal to its weight when not floating.

It is to be understood that the form of my invention herewith shown and described is to be taken as the preferred example of the same, and that various changes as to the shape, size, and arrangement of parts may be resorted to without departing from the spirit of the invention or the scope of the subjoined claims.

Having described the invention, what is claimed is:

1. A humidifier attachment for the water pan of a furnace comprising a nipple adapted to be passed through the side of the pan below the normal water level, a fitting connected with the nipple, a body of relatively soft metal located in the fitting and having a duct therethrough, a valve member having screw thread engagement with the fitting and adapted to close the duct, and a float connected with the valve for turning the same.

2. A humidifier attachment for the water pan of a furnace comprising a nipple, a fitting connected with the nipple, said fitting consisting of elbow members, a body of relatively soft material located in one elbow member, a tube carried by the said body and extending into the other elbow member and spaced from the inner wall surface thereof, said body having a duct opening through one end thereof and communicating with the tube, a valve member threaded in the fitting for closing the duct, and a float connected with the valve member.

3. A humidifier attachment for the water pan of a furnace comprising a fitting, a body of relatively soft metal located interiorly of the fitting and having a duct therethrough, a valve member threaded in the fitting for closing the duct, a pin carried by the valve member and extending into the duct, and a float connected with the valve member.

4. A humidifier attachment for the water pan of a furnace comprising a fitting, a body of relatively soft material located in the fitting, a tube carried by the body and extending through one end thereof and spaced from the inner wall of the fitting, said body having a duct opening through the other end thereof and communicating with the interior of the tube, a valve member threaded in the fitting, a pin carried by the valve member and extending through the duct, and a float connected with the valve member.

In testimony whereof, I have affixed my signature.

WALTER W. WARNER.